Patented Nov. 29, 1938

2,138,584

UNITED STATES PATENT OFFICE 2,138,584

POLYSULPHONES AND THEIR PREPARATION

Carl S. Marvel, Urbana, Ill., assignor to E. I. du Pont de Nemours & Company, Wilmington, Del., a corporation of Delaware No Drawing. Application February 20, 1937, Serial No. 126,811

12 Claims. (Cl. 260—2)

This invention relates to new compositions of matter and, more particularly, to polysulphones such as may be obtained by reacting acetylenic hydrocarbons with sulphur dioxide.

By the term "polysulphones" is meant that product resulting from an unsaturated hydrocarbon and sulphur dioxide combining in equimolecular ratios. While the olefin polysulphones are known, the acetylenic hydrocarbon polysulphones (i. e., polymeric acetylenic hydrocarbon-sulphur dioxide addition products) have not been prepared heretofore in so far as applicant is aware.

An object of the present invention is to provide new compositions of matter. A further object of the invention is to provide polysulphones from sulphur dioxide and acetylenic hydrocarbons. Other objects of the invention will be apparent from the description given hereinafter.

The above objects are accomplished according to the present invention by reacting sulphur dioxide, in the presence of a catalyst, with an acetylenic hydrocarbon represented by the formula RC≡CH wherein R is hydrogen or a monovalent hydrocarbon radical. Preferably, the reactants are in a liquid state, the acetylenic hydrocarbon contains at least 12 carbon atoms, and the reaction is carried out at superatmospheric pressure. In instances where R is aliphatic or alicyclic, best results are obtained when there is a methylene radical adjacent to the acetylenic carbon atom.

More specifically, the polysulphones of the present invention are prepared by placing a mixture of a liquid acetylenic hydrocarbon and liquid sulphur dioxide in a pressure vessel, adding catalyst, sealing the pressure vessel and allowing the reaction mixture to stand for about 24 hours, or until it comes to room temperature. Thereafter the pressure vessel is opened and the polysulphone formed, usually a solid mass, is isolated in convenient manner, as by dissolving the mass in a suitable solvent and pouring the solution into a large volume of water, or by pouring the reaction mixture directly into cold ethyl alcohol or water. The precipitated polysulphone is then washed with a suitable liquid such as alcohol or ether and dried.

As the catalyst in the present process, it is preferred to use ascaridole, a naturally occurring terpene peroxide although paraldehyde may also be used. "Aged" paraldehyde, that is, paraldehyde which has been exposed to the air at ordinary room temperatures for several months, is a more active catalyst than freshly prepared paraldehyde; it is believed that this is due to the probability that aged paraldehyde contains compounds of a peroxidic nature which tend to improve the catalytic action of the paraldehyde.

Hydrogen peroxide, which by itself has no accelerating effect on the reaction of the present invention, may be used advantageously in combination with paraldehyde, the ingredients of the mixed catalyst being added simultaneously or separately at different times. It is convenient to use dilute hydrogen peroxide of 2–3% strength although the concentration is not critical. The use of hydrogen peroxide in combination with paraldehyde is particularly desirable where freshly distilled acetylenic hydrocarbons are employed.

Ascaridole is a more active catalyst than either paraldehyde or paraldehyde-hydrogen peroxide mixtures and, further, gives more consistent and reproducible results.

Improved products, particularly where any trouble is being encountered with respect to whiteness or stability of the product, may be obtained by adding a relatively small quantity of ethyl alcohol to the reaction mixture, allowing the mixture to stand in the sealed pressure vessel several hours, then adding the catalyst, again sealing the pressure vessel, and allowing the mixture to stand until reaction is substantially complete. While ethyl alcohol is satisfactory and most convenient for this purpose, other alcohols can be used as propanol, isopropanol, butanol, isobutanol, benzyl alcohol, glycol and cyclohexanol. Saturated aliphatic alcohols containing not more than six carbon atoms are preferred. It is found that this expedient of using a small amount of alcohol in the manner indicated definitely promotes the formation of more nearly white and more stable polysulphones. For example, the polysulphone obtained from phenylacetylene and sulphur dioxide prepared in the absence of an alcohol tends to be slightly yellow, whereas it is white when prepared in the presence of, for example, n-propyl alcohol.

Where ascaridole is used as the catalyst, the speed of the reaction between the acetylenic hydrocarbon and sulphur dioxide varies with the amount of alcohol which is added, longer periods being required when relatively large quantities of alcohol are present and shorter periods when little or no alcohol is present. Larger quantities of alcohol appear to be conducive to the formation of polymers of proper physical texture to make purification easy. In the absence of alcohol, discolored products are apt to be obtained.

The following examples are given to illustrate specific embodiments of the invention wherein paraldehyde is employed as the catalyst:

*Example 1.*—A mixture of 15 cc. of freshly distilled heptyne-1, 30 cc. of liquid sulphur dioxide, and 2 cc. of 3% aqueous hydrogen peroxide was placed in a pressure flask and allowed to stand 36 hours. The flask was then cooled, opened, and 1 cc. of aged paraldehyde well mixed with the contents. Polymerization commenced at once and in one hour the reactants had formed a stiff, rubbery mass which was removed and allowed to stand in water over night. The resulting hard product was then dissolved in acetone and precipitated by pouring the solution slowly into water. The concentration of the acetone solution was sufficient to give immediate precipitation when the solution was poured into water. If the acetone solution is too dilute, a colloidal solution is obtained when it is poured into water. Likewise, if the concentrated acetone solution is poured into water too rapidly, a "ropy" mass is obtained which is difficult to wash and dry.

The precipitated product was then washed with cold water and dried at 100° C., a yield of 60% being obtained. The product was soluble in acetone and insoluble in ethyl alcohol, ether, and cold 10% sodium hydroxide solution. It melted at 160–164° C. and decomposed at 190–195° C. Analysis showed that the acetylene and sulphur dioxide combined in a 1:1 ratio. Analysis: Calculated for $C_7H_{12}SO_2$: C, 52.5%; H, 7.5%; S, 20.0%. Found: C, 52.38%; H, 7.58%; S, 19.42%.

Thin sheets of this polysulphone may be obtained by pouring the acetone solution on to a glass surface and wetting the film with water. In this form the polymer is readily dried.

*Example 2.*—A mixture of 4 cc. of propyne, 10 cc. of liquid sulphur dioxide, and 1 cc. of 3% aqueous hydrogen peroxide was placed in a pressure flask and allowed to stand 24 hours. One cc. of aged paraldehyde was added as in Example 1 and the mixture allowed to stand an additional 24 hours. The reaction mixture was then poured into water and the precipitated solid material purified by grinding with alcohol and ether, and then dried in an oven at 100° C.

A 50% yield was obtained. The product was insoluble in ether, alcohol, acetone, carbon tetrachloride, benzene, cold concentrated sulphuric acid and chloroform. Slow decomposition occurred when the material was heated at 250–260° C. Analysis: Calculated for $C_3H_4SO_2$: C, 34.6%; H, 3.85%. Found: C, 34.37%; H, 3.95%.

*Example 3.*—A mixture of 6 cc. of butyne-1, 10 cc. of liquid sulphur dioxide, and 1 cc. of 3% hydrogen peroxide was allowed to stand in a pressure flask for 36 hours. Five cc. of aged paraldehyde was added, the mixture was allowed to stand in the sealed flask for 2 hours, and the solid polysulphone isolated as described in Example 2. A yield of 50% was obtained.

*Example 4.*—A mixture of 10 cc. of butyne-1 and 10 cc. of sulphur dioxide was allowed to stand in a pressure flask for 18 hours. One cc. of aged paraldehyde was added and the reaction mixture allowed to stand for 18 hours. The polysulphone was isolated as described in Example 3, a yield of 50% being obtained.

The butyne-1-sulphur dioxide reaction product was insoluble in acetone, ether, benzene, cold concentrated sulphuric acid, and acetone. It decomposed in cold 10% sodium hydroxide solution or when heated at 210–215° C. Analysis: Calculated for $C_4H_6SO_2$: S, 27.0%. Found: S, 26.36%.

The butyne used in Example 4 had stood about a week in a partly filled closed container at 0° C. When freshly distilled butyne is used, it is necessary to use hydrogen peroxide in conjunction with the paraldehyde to catalyze the reaction in order to have the reaction proceed at an appreciable speed.

*Example 5.*—The polysulphone of pentadecyne-1 and sulphur dioxide, prepared according to the procedure described in the preceding examples, was purified by pouring into alcohol, and fractionally crystallizing it from acetone. It is a waxy product melting at 120–140° C. and soluble in hot acetone. Analysis: Calculated for $C_{15}H_{28}SO_2$: C, 66%; H, 10.3%; S, 11.7%. Found: C, 64.6%; H, 10.1%; S, 11.5%.

*Example 6.*—The polysulphone of 3-cyclohexylpropyne-1 was prepared as in Example 5. This polymer is insoluble in acetone and melts with decomposition at 110–145° C. Analysis: Calculated for $C_9H_{14}SO_2$: S, 17.2%. Found: S, 16.1%.

*Example 7.*—A mixture of 5 cc. of liquid sulphur dioxide, 5 cc. of pentyne-1, and 1 cc. of 3% hydrogen peroxide was allowed to stand in a sealed container for 3 hours. Ten cc. of paraldehyde was added, the mixture was allowed to stand another hour, and then poured into water. One gram of a white solid polymer was obtained.

As shown in Table I below, a number of polysulphones were prepared by reacting various acetylenic hydrocarbons with sulphur dioxide in the presence of ethyl alcohol, aged paraldehyde being the catalyst used. In each instance, 5 cc. of ethyl alcohol was added to a mixture of 10 cc. each of liquid sulphur dioxide and the acetylenic hydrocarbon in a pressure flask. The flask was sealed, allowed to stand over night, then cooled and opened to permit the addition of from 1–5 cc. of aged paraldehyde. The flask was then again sealed and allowed to come to room temperature. The reaction mixture was poured into water and the product collected on a filter, the excess sulphur dioxide and paraldehyde being removed by triturating with alcohol and ether several times. The polymer from pentyne-1 was further purified by dissolving in dioxan and reprecipitating by the addition of water. The products from hexyne-1 and heptyne-1 were purified similarly with acetone as the solvent.

The polysulphones from propyne, butyne-1, and pentyne-1 are white powdery amorphous substances. The polysulphones from hexyne-1 and heptyne-1 are more flaky and not easily ground to powder. The polysulphones derived from propyne, butyne-1, and phenylacetylene are insoluble in water, alcohol, ether, acetone, carbon tetrachloride, chloroform, benzene, and cold concentrated sulphuric acid. The polysulphones from pentyne, hexyne-1, and heptyne-1 are soluble in dioxan and can be precipitated from this solvent by the addition of water. The polysulphones from hexyne-1 and heptyne-1 are soluble in acetone.

TABLE I

*Polysulphones from monosubstituted acetylenes*

| | Yield | Temperature of decomposition | Empirical formula | S analyses, percent | |
|---|---|---|---|---|---|
| | | | | Calc'd | Found |
| | Percent | °C. | | | |
| Propyne | 40 | 250–260 | $C_3H_4SO_2$ | 30.8 | 29.4 ...... |
| Butyne-1 | 30 | 210–215 | $C_4H_6SO_2$ | 27.0 | 26.4  26.3 |
| Pentyne-1 | 60 | 203–208 | $C_5H_8SO_2$ | 24.2 | 23.8  23.6 |
| Hexyne-1 | 90 | 195–205 | $C_6H_{10}SO_2$ | 21.9 | 21.5  21.3 |
| Heptyne-1 | 75 | 164–170 | $C_7H_{12}SO_2$ | 20.0 | 19.42 ...... |
| Phenyl-acetylene | 50 | 250–275 | $C_8H_6SO_2$ | 19.3 | 18.5  18.7 |

The use of ascaridole as the catalyst is illustrated in the following examples:

*Example 8.*—A mixture of 10 cc. of pentyne-1, 10 cc. of sulphur dioxide, 5 cc. of ethyl alcohol, and 3 drops of ascaridole was allowed to stand in a sealed pressure flask for 10 hours. The reaction mixture was then poured into alcohol and the precipitated polymer purified and dried as described in Example 2, a yield of 8 g. being obtained.

*Example 9.*—Example 8 was repeated using .4 cc. of ascaridole, 10 cc. of alcohol, and a reaction period of only 1.5 hours. A yield of 8 g. of polymer was obtained.

*Example 10.*—Five cc. of freshly distilled phenylacetylene, 5 cc. of sulphur dioxide, 3 cc. of ethyl alcohol, and 1 cc. of ascaridole were allowed to react in a pressure flask as in the preceding examples. After one hour the reaction mixture was poured into alcohol and purified as in Example 2. A yield of 5 g. of polymer was obtained.

*Example 11.*—A mixture of 5 cc. of pentyne-1, 5 cc. of sulphur dioxide, and 0.2 cc. of ascaridole was reacted for one and one-half hours as in Example 8. Four grams of a somewhat dark polymer was obtained.

*Example 12.*—A mixture of 10 cc. of pentyne-1, 10 cc. of sulphur dioxide, and 1 cc. of ethyl alcohol was allowed to stand in a pressure flask for 10 hours. No polymer was formed. One cc. of ascaridole was then added and the mixture was allowed to stand one hour. The reaction product was isolated as described in preceding examples, 4.5 g. of polymer being obtained.

*Example 13.*—Procedure of Example 12 was repeated with 5 cc. of pentyne-1, 5 cc. of sulphur dioxide, .2 cc. of ascaridole, and 10 cc. of ethyl alcohol. After a reaction period of 10 hours, 3.6 g. polymer was obtained.

*Example 14.*—A mixture of 5 cc. of pentyne-1, 5 cc. of sulphur dioxide, 1 cc. of ethyl alcohol, and 0.05 cc. of ascaridole was reacted in a pressure flask for 10 hours as described in preceding examples. The polymer was then precipitated and purified by pouring into alcohol, a yield of 3.1 g. being obtained.

*Example 15.*—A mixture of 5 cc. of pentadecyne-1, 5 cc. of liquid sulphur dioxide, 1 cc. of ethyl alcohol and 0.2 cc. of ascaridole was allowed to stand under pressure for about five hours. The polymer was purified, as described in Example 5 above. The yield was 50 per cent of the theoretical amount.

The above examples are merely illustrative and it will be understood that the invention is applicable to acetylenic hydrocarbons generally, either singly or as mixtures. Among such acetylenic hydrocarbons may be mentioned acetylene itself, propyne, butyne-1, pentyne-1, hexyne-1, heptyne-1, dodecyne-1, pentadecyne-1, octadecyne-1, 3-cyclohexylpropyne-1, phenylacetylene, and the like. The acetylenic hydrocarbons containing at least 12 carbon atoms are of particular interest because they give products waxy in nature.

The proportion of sulphur dioxide and acetylenic hydrocarbon in the reaction of the present invention may be varied more or less as desired but it is preferred to use either equal volumes of the two reactants, or an excess of the sulphur dioxide. If an excess of either reactant is employed, it is desirable not to use proportions in excess of about 2–1 by volume as a matter of convenience and economy, although larger proportions of either reactant are quite operable.

The proportion of catalyst may be varied widely and the optimum proportion under any different set of conditions would ordinarily be established by preliminary experimentation. Using ascaridole, a range of 0.5–5.0% by volume of the combined liquid acetylenic hydrocarbon and sulphur dioxide would usually not be exceeded, although proportions outside such range are by no means inoperative. With aged paraldehyde, 2.0–25.0% by volume of the liquid reactants represents a practical range with 5% usually being sufficient. If hydrogen peroxide is used, a proportion of 0.06–0.30 gram of pure hydrogen peroxide per 100 cc. of the liquid reactants, i. e., 2.0–10.0% of the 3% aqueous hydrogen peroxide solution, is preferred. The use of hydrogen peroxide in conjunction with paraldehyde in no case is harmful but its chief value is in assisting the acceleration of the reaction where a freshly distilled acetylenic hydrocarbon is being used.

The actual mechanics of carrying out the reaction of the present invention are subject to wide variations as those skilled in the art will understand. Although the pressure is not critical, it is convenient to carry out the reaction in a closed system as illustrated in the examples. However, the reaction may be carried out at atmospheric pressure if provision is made for minimizing loss of reactants by volatilization, as a reflux condenser, or the like. Ordinarily, it is most convenient to mix the reactants in liquid form at temperatures at which they remain liquid at atmospheric pressure, and then let the mixture slowly come back to room temperature in a sealed vessel. The reaction mixtures may actually be heated under pressure to any temperature at which the unreacted acetylenic hydrocarbon, sulphur dioxide, and addition products are stable.

The polysulphones of the present invention are useful in the preparation of molded articles either alone or modified with natural or synthetic resins, or with cellulose derivatives, waxes, fillers, pigments, dyes, and plasticizers such as dibutyl phthalate, fatty oils, hydrocarbon polymers, and the like. The resins may be used for preparing massive blocks, sheets, and similar articles by molding. For example, they are useful in compositions used for molding base boards, window frames, or materials for structural work where low cost is essential.

They are also useful as coating compositions when dissolved in suitable solvents. Such compositions, either alone or modified with materials of the types enumerated above, may be employed for coating such surfaces as wood, metals, glass, textile fabrics, paper, stone, concrete, brick, and plaster board. Some of these products are also useful as fillers or pigments, being non-reactive and in some cases insoluble in the usual paint, varnish, and lacquer solvents.

An advantage of the present invention is that it provides new and useful compositions of matter having valuable technical properties and being relatively inexpensive. A further advantage of the invention is that it provides a simple and practical process of preparing such resins.

As many apparently widely different embodiments of this invention may be made without departing from the spirit and scope thereof, it is to be understood that the invention is not limited to the specific embodiments thereof except as defined in the appended claims.

I claim:

1. Process comprising reacting sulphur dioxide in the presence of a catalyst comprising essentially ascaridole with an acetylenic hydrocarbon having the formula RC≡CH in which R represents a monovalent constituent from the group consisting of hydrogen and monovalent hydrocarbon radicals.

2. Process comprising reacting sulphur dioxide in the presence of a catalyst comprising essentially aged paraldehyde with an acetylenic hydrocarbon having the formula RC≡CH in which R represents a monovalent constituent from the group consisting of hydrogen and monovalent hydrocarbon radicals.

3. Process comprising reacting sulphur dioxide in the presence of a catalyst comprising essentially aged paraldehyde and hydrogen peroxide with an acetylenic hydrocarbon having the formula $RC \equiv CH$ in which R represents a monovalent constituent from the group consisting of hydrogen and monovalent hydrocarbon radicals.

4. Process comprising reacting sulphur dioxide in the presence of an alcohol with an acetylenic hydrocarbon having the formula $RC \equiv CH$ in which R represents a monovalent constituent from the group consisting of hydrogen and monovalent hydrocarbon radicals.

5. Process comprising reacting sulphur dioxide in the presence of an alcohol and a catalyst comprising essentially ascaridole with an acetylenic hydrocarbon having the formula $RC \equiv CH$ in which R represents a monovalent constituent from the group consisting of hydrogen and monovalent hydrocarbon radicals.

6. Process comprising reacting sulphur dioxide in the presence of an alcohol and a catalyst comprising essentially aged paraldehyde with an acetylenic hydrocarbon having the formula $RC \equiv CH$ in which R represents a monovalent constituent from the group consisting of of hydrogen and monovalent hydrocarbon radicals.

7. Process comprising reacting sulphur dioxide in a closed system in the presence of an alcohol with an acetylenic hydrocarbon having the formula $RC \equiv CH$ in which R represents a monovalent constituent from the group consisting of hydrogen and monovalent hydrocarbon radicals.

8. Process comprising reacting sulphur dioxide in a closed system in the presence of ethyl alcohol and a catalyst comprising essentially ascaridole with an acetylenic hydrocarbon having the formula $RC \equiv CH$ in which R represents a monovalent constituent from the group consisting of hydrogen and monovalent hydrocarbon radicals.

9. Process comprising reacting sulphur dioxide in a closed system in the presence of ethyl alcohol and a catalyst comprising essentially aged paraldehyde with an acetylenic hydrocarbon having the formula $RC \equiv CH$ in which R represents a monovalent constituent from the group consisting of hydrogen and monovalent hydrocarbon radicals.

10. A polymeric product consisting of sulphur dioxide and pentadecyne-1 chemically combined in substantially equimolecular ratio.

11. Process comprising reacting sulphur dioxide in the presence of a catalyst selected from the group consisting of ascaridole, aged paraldehyde, and aged paraldehyde in combination with hydrogen peroxide, with an acetylenic hydrocarbon having the formula $RC \equiv CH$ in which R represents a monovalent constituent from the group consisting of hydrogen and monovalent hydrocarbon radicals.

12. Reaction products of sulphur dioxide and an acetylenic hydrocarbon having at least one acetylenic hydrogen atom and containing at least twelve carbon atoms.

CARL S. MARVEL.